(12) United States Patent  
Osborne

(10) Patent No.: US 7,109,907 B2
(45) Date of Patent: Sep. 19, 2006

(54) SYSTEMS AND METHODS OF BIDIRECTIONAL COMMUNICATION ACROSS AN ISOLATION BARRIER

(75) Inventor: Thomas W. Osborne, San Jose, CA (US)

(73) Assignee: Infineon Technologies North America Corp., San Jose, CA (US)

( * ) Notice: Subject to any disclaimer, the term of this patent is extended or adjusted under 35 U.S.C. 154(b) by 0 days.

(21) Appl. No.: 11/223,543

(22) Filed: Sep. 9, 2005

(65) Prior Publication Data
US 2006/0017594 A1   Jan. 26, 2006

Related U.S. Application Data

(63) Continuation of application No. 10/313,207, filed on Dec. 7, 2002, now Pat. No. 6,965,336.

(60) Provisional application No. 60/341,154, filed on Dec. 10, 2001.

(51) Int. Cl.
H03M 1/12 (2006.01)
(52) U.S. Cl. .................... 341/155; 341/156
(58) Field of Classification Search ............. 341/155, 341/156
See application file for complete search history.

(56) References Cited

U.S. PATENT DOCUMENTS

| 5,500,895 | A | | 3/1996 | Yurgelites |
| 5,602,912 | A | | 2/1997 | Hershbarger |
| 5,870,046 | A | * | 2/1999 | Scott et al. ............ 341/143 |
| 5,991,335 | A | | 11/1999 | Price |
| 6,107,948 | A | * | 8/2000 | Scott et al. ............ 341/143 |
| 6,137,827 | A | * | 10/2000 | Scott et al. ............ 375/219 |
| 6,225,927 | B1 | * | 5/2001 | Scott et al. ............ 341/110 |
| 6,965,336 | B1 | * | 11/2005 | Osborne ................ 341/155 |

FOREIGN PATENT DOCUMENTS

WO      00/30333      5/2000

* cited by examiner

*Primary Examiner*—Rexford Barnie
*Assistant Examiner*—Joseph Lauture
(74) *Attorney, Agent, or Firm*—Baker Botts L.L.P.

(57) ABSTRACT

A bi-directional isolation scheme is described in which digital data, including clock information, may be communicated bi-directionally across a single isolation barrier without requiring a phase locked loop (PLL) based clock recovery procedure. In this way, the lead-time needed by the receiving circuit to recover the data clock signal may be reduced and the polarity (or 180° phase) ambiguities often associated with PLL-based methods may be avoided.

18 Claims, 5 Drawing Sheets

SYSTEMS AND METHODS OF BIDIRECTIONAL COMMUNICATION ACROSS AN ISOLATION BARRIER

This Application Claims The Benefit Of Provisional Application 60/341,154, Filed Dec. 10, 2001.

CROSS REFERENCE TO RELATED APPLICATION

This application is a continuation of U.S. patent application Ser. No. 10/313,207 entitled "Systems and Methods of Bidirectional Communication Across an Isolation Barrier" filed by Thomas W. Osborne on Dec. 7, 2002, is now a U.S. Pat. No. 6,965,336 which claims the benefit of U.S. Provisional Application Ser. No. 60/341,154 entitled "Systems and Methods of Bidirectional Communication Across an Isolation Barrier" filed by Thomas W. Osborne on Dec. 10, 2001, the contents of both are hereby incorporated by reference.

TECHNICAL FIELD

This invention relates to systems and methods of bi-directional communication across an isolation barrier.

BACKGROUND

Isolation barriers are used in many industrial, medical and communication applications where it is necessary to electrically isolate two sections of electronic circuitry from one another. An electrical isolation barrier must exist, for example, in communication circuitry that is connected directly to the standard two-wire public switched telephone network and that is powered through a standard residential wall outlet. In general, two sections of electronic circuitry are considered to be electrically isolated if a source of a large magnitude voltage (e.g., on the order of one thousand volts, or more), which is coupled on one side of the barrier, causes less than a minimal current flow (e.g., on the order of ten milliamperes, or less) through the barrier. High voltage isolation barriers commonly are implemented using transformers, capacitors, or opto-isolators, which transfer signals across the isolation barrier using magnetic fields, electric fields, or light, respectively.

In many applications, there exists an analog or continuous time varying signal on one side of the isolation barrier, and the information contained in that signal, as well as control information and synchronizing clock information, must be communicated across the isolation barrier. For example, common telephone network modulator/demodulator (or modem) circuitry, which is powered by a residential wall outlet, typically must transfer an analog signal with a bandwidth of approximately 4 kilohertz across an isolation barrier for transmission over the two-wire, public switched telephone network. In general, the isolation method and associated isolation circuitry should provide a reliable communication channel for the information to be conveyed across the isolation barrier. Thus, the isolating elements themselves should not significantly distort the signal information, the communication should be substantially insensitive to or undisturbed by voltage signals and impedances that exist between the isolated circuitry sections, and the communication should be substantially insensitive to or undisturbed by noise sources in physical proximity to the isolating elements.

Many different schemes for communicating analog signals across an isolation barrier have been proposed. Most of these approaches involve converting the analog signals into a digital format using pulse code modulation (PCM) techniques. For example, U.S. Pat. Nos. 5,500,894 and 5,602,912 describe a communication scheme in which an analog signal with information to be communicated across an isolation barrier is converted to a digital format, with the amplitude of the digital signal restricted to standard digital logic levels. The digital signal is transmitted across the barrier by means of two, separate high voltage isolation capacitors. One capacitor is used to transfer the digital signal logic levels, while a separate capacitor is used to transmit a clock or timing synchronization signal across the barrier. The clock signal is used on the receiving side of the barrier as a time base for analog signal recovery.

U.S. Pat. No. 4,901,275 describes a communication scheme in which an analog-to-digital converter (ADC) converts several, multiplexed analog channels into digital format for transmission to a digital system. Opto isolators are used to isolate the ADC from electrical noise that is generated in the digital system. Serial data transmission across the isolation barrier is synchronized by a clock signal that is passed through a separate opto-isolator. The ADC clock is required for reliable signal reconstruction across the isolation barrier.

U.S. Pat. No. 6,225,927 describes an analog isolation system with digital communication across a capacitive barrier. In this approach, clock recovery circuitry may be employed on one side of the isolation barrier to extract timing information from the digital signal that is communicated across the barrier, and to filter the effects of phase noise that is introduced at the barrier. Delta-sigma converters may be disposed on both sides of the isolation barrier to convert signals between analog and digital domains. Bi-directional communication of digital signals is accomplished using a single pair of isolation capacitors. In preferred embodiments, the digital data communicated across the barrier consists of digital delta-sigma data signals multiplexed in time with other digital control information, signaling information, and framing information.

SUMMARY

The invention features a bi-directional isolation scheme (systems and methods) in which digital data, including clock information, may be communicated bi-directionally across a single isolation barrier without requiring a phase locked loop (PLL) based clock recovery procedure. In this way, the invention reduces the lead-time needed by the receiving circuit to recover the data clock signal and avoids polarity (or 180° phase) ambiguities often associated with PLL-based methods.

In one aspect, the invention features a bi-directional isolation system for providing an isolated communication channel for a source data signal synchronized by a source clock signal. The bi-directional isolation system includes a bi-directional isolation barrier, a source interface circuit that is coupled on one side of the isolation barrier, and an isolated interface circuit that is coupled on an opposite side of the isolation barrier. The source interface circuit is configured to multiplex the source clock signal on the source data signal and to transmit the multiplex signal across the isolation barrier. The isolated interface circuit is configured to generate from the multiplex signal a recovered data signal and a recovered clock signal synchronized with the source clock signal.

Embodiments of the invention may include one or more of the following features.

The source interface circuit preferably multiplexes the source clock signal on the source data signal by summing the source clock signal and the source data signal. The source interface circuit preferably is configured to quantize the source data signal and the source clock signal to respective logic levels. The source clock signal logic levels preferably span a wider range of values than the source data- signal logic levels.

In some embodiments, the isolated interface circuit generates the recovered clock signal by slicing the multiplex signal. The isolated interface circuit may generate the recovered clock signal by slicing the multiplex signal at an intermediate multiplex signal level. For example, the isolated interface circuit may generate the recovered clock signal by slicing the multiplex signal at a level that is between a sum of a low source data signal logic level and a high source clock signal logic level and a sum of a high source data signal logic level and a low source clock signal logic level.

The isolated interface circuit may generate the recovered data signal by slicing a time-delayed version of the multiplex signal. The time-delayed version of the multiplex signal preferably is sliced synchronously with the recovered clock signal. The time-delayed version of the multiplex signal may be sliced at a level that is greater than a sum of a low source data signal logic level and a high source clock signal logic level. Alternatively, the time-delayed version of the multiplex signal may be sliced at a level less than a sum of a high source data signal logic level and a low source clock signal logic level.

In another aspect, the invention features a bi-directional isolation method for providing an isolated communication channel across a bi-directional isolation barrier for a source data signal synchronized by a source clock signal. On one side of the isolation barrier, the source clock signal is multiplexed on the source data signal and the multiplex signal is transmitted across the isolation barrier. On an opposite side of the isolation barrier, a recovered data signal and a recovered clock signal synchronized with the source clock signal are generated from the multiplex signal.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

Figure 1:
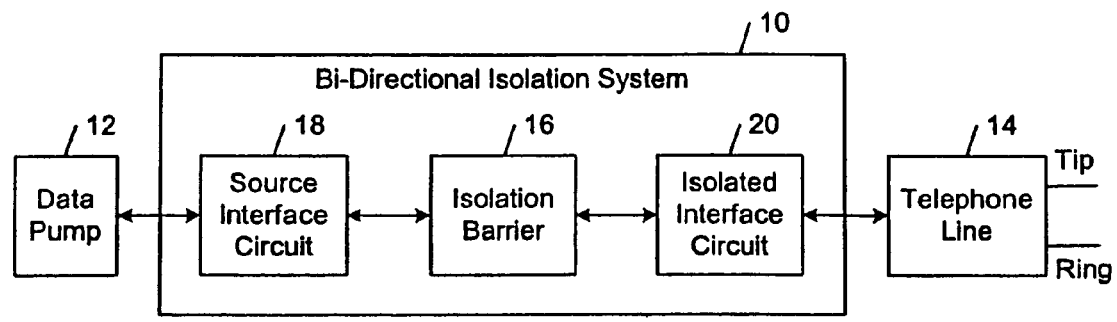
FIG. 1 is a block diagram of a bi-directional isolation system providing an isolated communication channel between a data pump and a telephone line.

Referring to FIG. 1, in one embodiment, a bi-directional isolation system 10 provides an isolated communication channel between a data pump 12 and a telephone line 14. Data pump 12, for example, may be incorporated into a telephone system that includes circuitry that is powered by a source that is external to the public telephone system. In order to protect the public telephone system (and to comply with governmental regulations), bi-directional isolation system 10 isolates such powered circuitry from isolated circuitry that connects directly to telephone line 14. Bi-directional isolation system 10 includes an isolation barrier 16 that is coupled between a source interface circuit 18 and an isolated interface circuit 20. Isolation barrier 16 is configured to block harmful levels of electrical power from passing from data pump 12 to telephone line 14, while accurately passing the desired signals from the data pump side 12 to the telephone line side and vice versa. Isolation barrier 16 may be a conventional bi-directional isolation barrier that is implemented using conventional components, including transformers, capacitors, or opto-isolators.

In the illustrated embodiment, source interface circuit 18 is configured to provide an interface between data pump 12 and isolation barrier 16, and isolated interface circuit 20 is configured to provide an interface between isolation barrier 16 and telephone line 14. In this context, the terms "source" and "isolated" are not intended to connote an absolute position with respect to data pump 12 and telephone line 14. Rather these terms are used merely to signify relative positions with respect to isolation barrier 16 (i.e., locations on opposite sides of isolation barrier 16). Thus, in other embodiments, the locations of source interface circuit 18 and isolated interface circuit may be interchanged.

Figure 2:
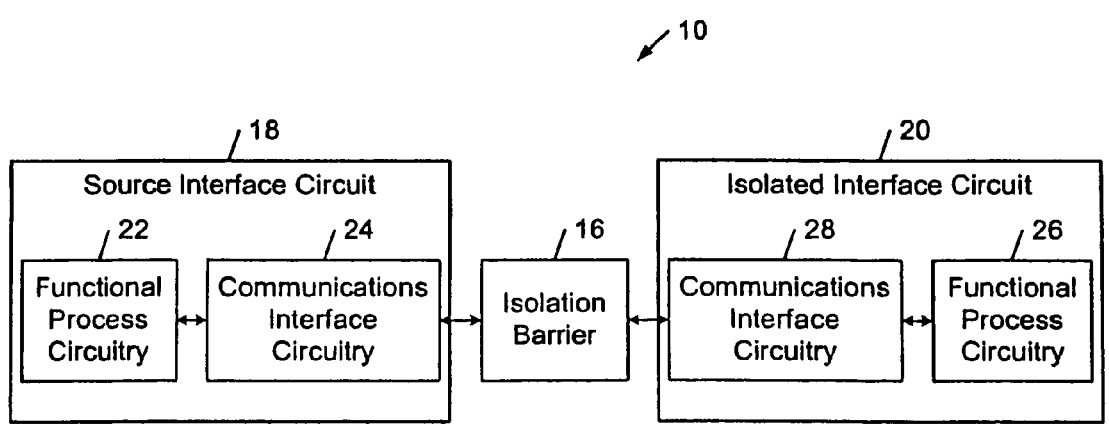
FIG. 2 is a block diagram of a bi-directional isolation barrier coupled between a source interface circuit and an isolated interface circuit.
Figure 3:
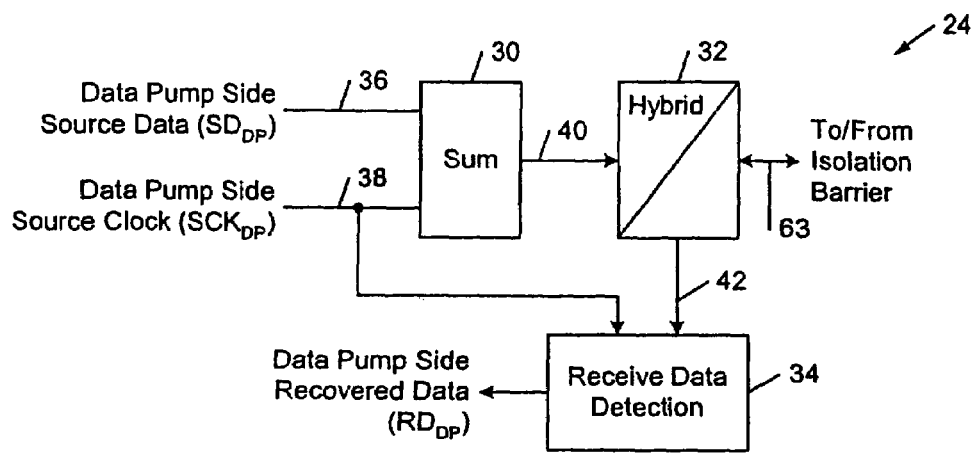
FIG. 3 is a block diagram of the source interface circuit of FIG. 2.

Referring to FIG. 2, in one embodiment, source interface circuit 18 includes functional process circuitry 22 and communications interface circuitry 24. Similarly, isolated interface circuit 20 includes functional process circuitry 26 and communications interface circuitry 28. The functional process circuitry 22, 26 may be implemented as conventional functional process circuits that are found commonly in, for example, conventional data access arrangement (DAA) systems that interface modem data pumps and telephone lines. The communications interface circuitry 24, 28, on the other hand, are unique in that that allow a source data signal and a source clock signal to be transmitted simultaneously across a single isolation barrier, without requiring the use of a PLL clock recovery scheme on the opposite side of the isolation barrier. The communications interface circuitry 24, 28, therefore, avoid problems, such as clock slips and clock recovery delays, that often occur in PLL-based clock recovery approaches. To the contrary, the communications interface circuitry 24, 28, enables the clock signal to be recovered on the first clock pulse and may be used on the first data pulse to detect the data sent in either direction across isolation barrier 16.

Referring to FIGS. 3, 4A, 4B and 4C, in one embodiment, source communications interface circuitry 24 of source interface circuit 18 includes a summing circuit 30, a hybrid circuit 32, and a receive data detection circuit 34. Summing circuit 30 is a conventional summing circuit that is configured to sum a data pump side source data signal 36 ($SD_{DP}$) and a data pump side source clock signal 38 ($SCK_{DP}$) to produce a multiplex signal 40 ($MX_{DP}$). Hybrid circuit 32 is configured to superimpose a signal proportional to multiplex signal 40 onto signal 63, and to generate a line side source data signal 42 that is proportional to signal 63 with the superimposed multiplex signal 40 removed.

Figure 4A:
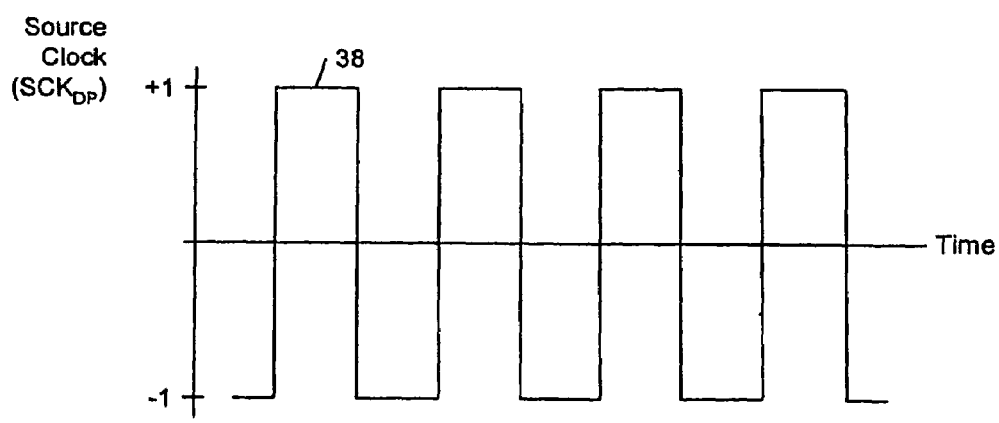
FIG. 4A is a graph of a source clock signal plotted as a function of time.
Figure 4B:
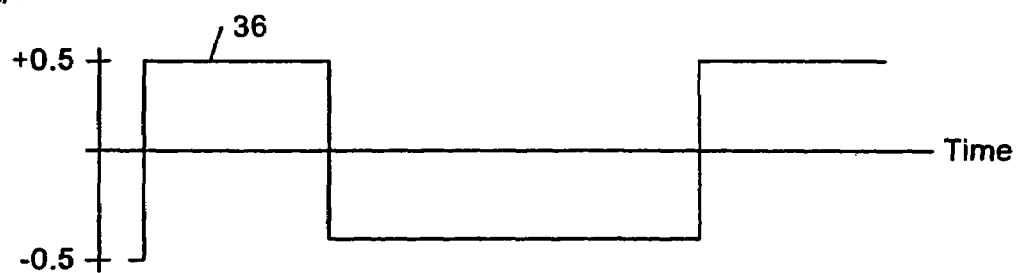
FIG. 4B is a graph of a source data signal plotted as a function of time.
Figure 4C:
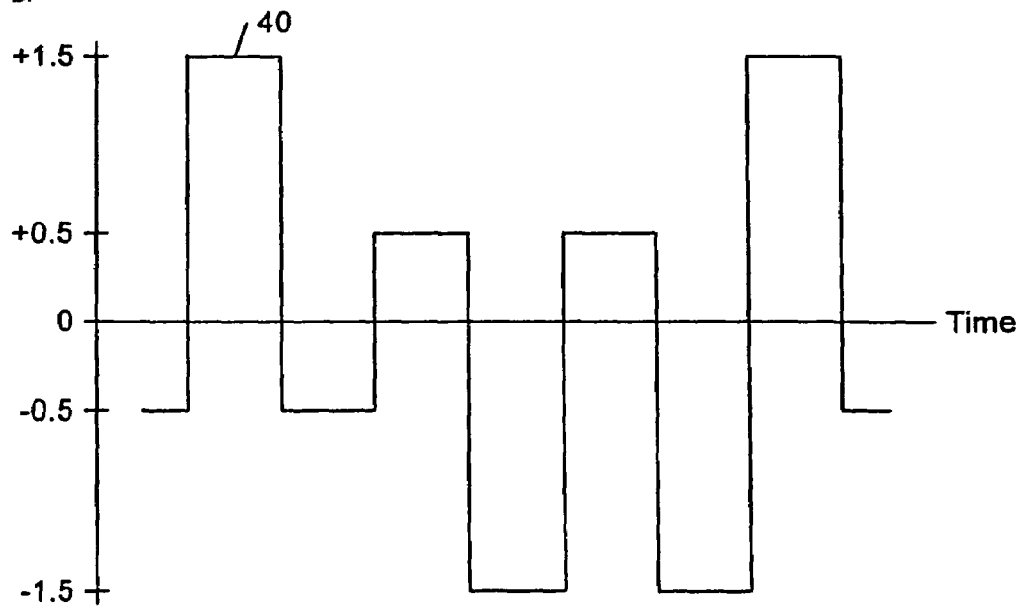
FIG. 4C is a graph of a multiplex signal plotted as a function of time.
Figure 5:
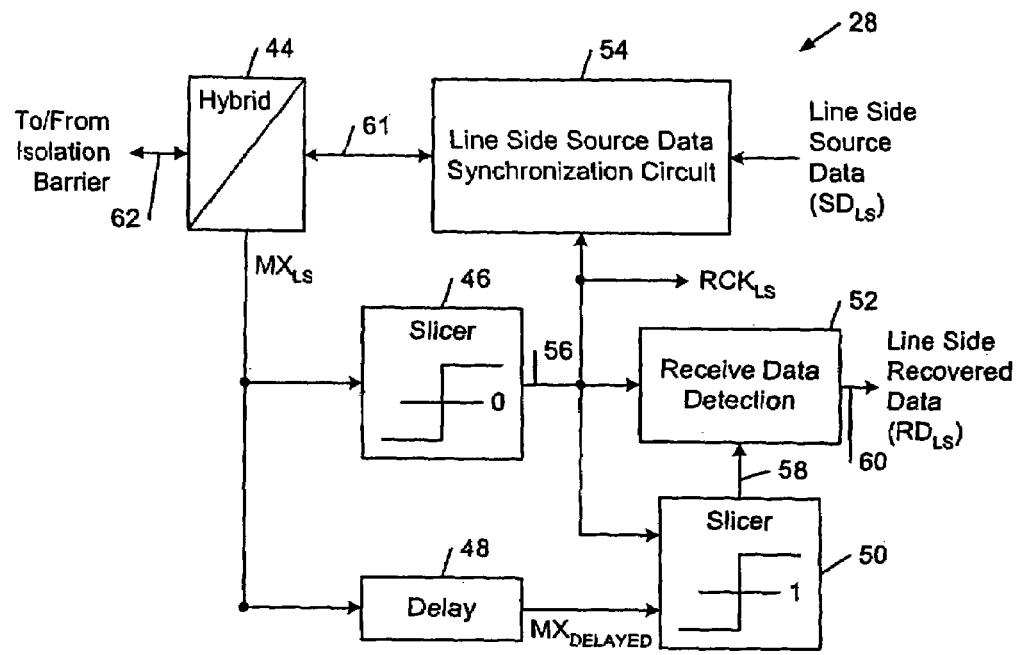
FIG. 5 is a block diagram of the isolated interface circuit of FIG. 2.
Figure 6A:
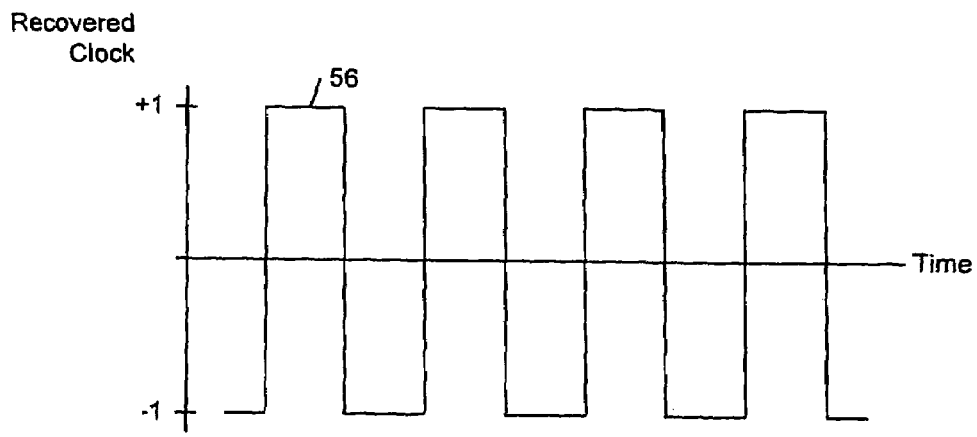
FIG. 6A is a graph of a recovered clock signal plotted as a function of time.
Figure 6B:
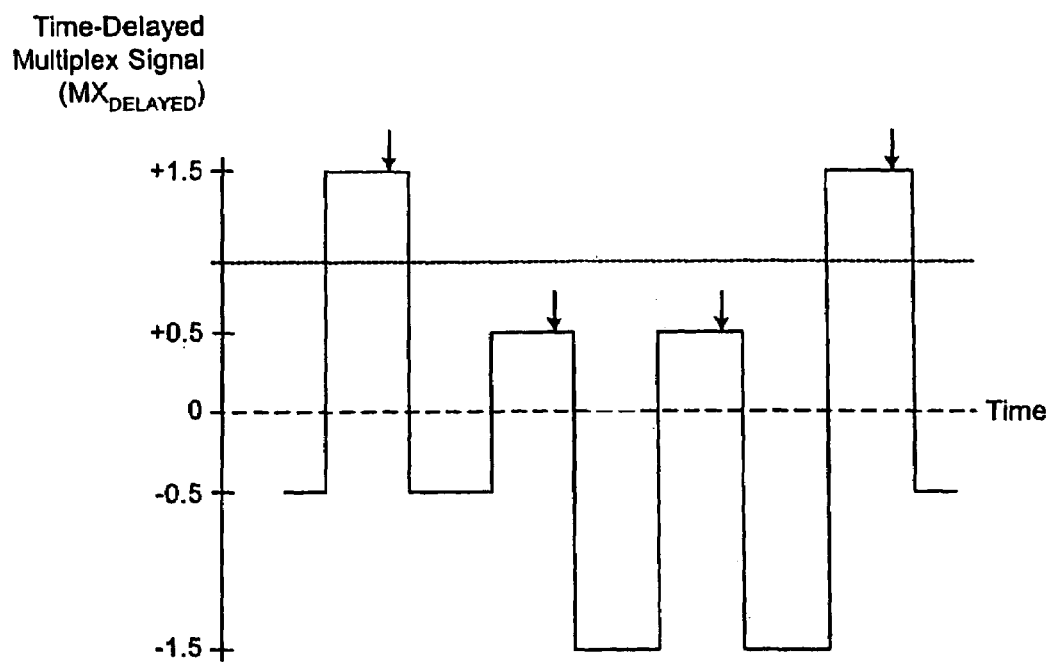
FIG. 6B is a graph of a time-delayed version of the multiplex signal of FIG. 4C plotted as a function of time.
Figure 6C:
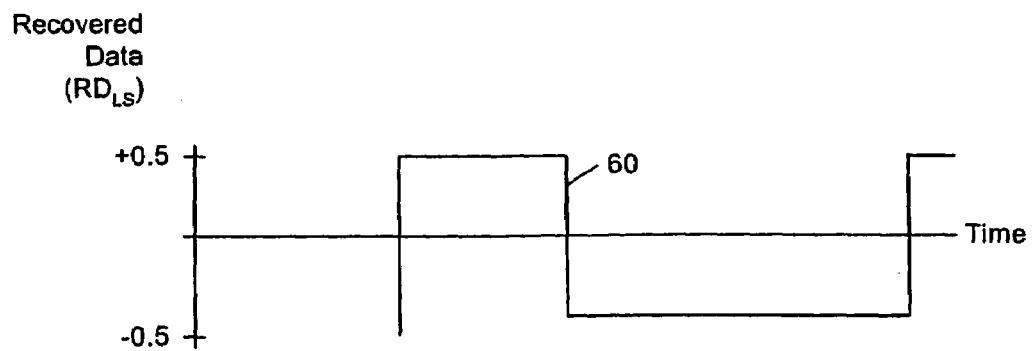
FIG. 6C is a graph of a recovered data signal plotted as a function of time.

As shown in FIGS. 4A–4C, before they are summed by summing circuit 30, source data signal 36 ($SD_{DP}$) and source clock signal 38 ($SCK_{DP}$) are quantized to respective, different high and low logic levels. The source clock signal logic levels preferably span a wider range of values than the source data logic levels. In the illustrated embodiment, source data signal 36 ($SD_{DP}$) is quantized to high and low logic levels of +0.5 and −0.5, respectively, and source clock signal 38 ($SCK_{DP}$) is quantized to high and low logic levels of +1 and −1, respectively. The resulting multiplex signal 40 ($MX_{DP}$) may have a value of +1.5, +0.5, −0.5, or −1.5, depending upon the particular values of source data signal 36 ($SD_{DP}$) and source clock signal 38 ($SCK_{DP}$).

Referring to FIGS. 5, 6A, 6B and 6C, in one embodiment, source communications interface circuitry 28 of isolated interface circuit 20 includes a hybrid circuit 44, a clock recovery slicer circuit 46, a delay circuit 48, a data recovery slicer circuit 50, a receive data detection circuit 52, and a line side source data synchronization circuit 54. Hybrid circuit 44 is configured to superimpose a signal proportional to signal 61 onto the signal found at 62, and to generate a signal $MX_{LS}$ that is proportional to the signal at node 62 with the superimposed signal 61 removed.

The signals 62 and 63 each includes a signal that is proportional to the multiplex signal 40 and a signal that is proportional to signal 61. The signals 62 and 63 also may contain additional signals, such as—but not limited to—man-made or naturally occurring signals (e.g., uncorrelated noise and high voltages that may vary with time). These additional signals may be common mode signals found at nodes 63 and/or 62, or superimposed on nodes 63 and/or 62. Such signals may cause errors at the data detection and recovery circuitry 34 and the clock and data slicer circuits 46 and 50 and, therefore, should be taken into account when designing an actual implementation so that the effects of interfering sources that may occur at nodes 62 and 63 may be minimized.

Clock recovery slicer circuit 46 may be implemented as a conventional slicer circuit that samples a received signal and outputs a high logic level when the sampled signal value is greater than a target value, and outputs a low logic level when the sampled signal value is less than the target value. Clock recovery slicer circuit 46 is configured to generate a recovered clock signal 56 ($RCK_{LS}$) by slicing multiplex signal ($MX_{LS}$) at an intermediate multiplex signal level. In particular, clock recovery slicer circuit 46 is configured to slice the multiplex signal ($MX_{LS}$) at a level between the sum of the low source data signal logic level and the high source clock signal logic level and the sum of a high source data signal logic level and a low source clock signal logic level. In the illustrated embodiment, clock recovery slicer circuit 46 may slice the multiplex signal ($MX_{LS}$) at a level between −0.5 and +0.5, and preferably slices the multiplex signal at a level of 0.

Delay circuit 48 may be implemented as a convention delay circuit that is configured to generate a time-delayed version of multiplex signal ($MX_{DELAYED}$). The time-delayed version of multiplex signal ($MX_{DELAYED}$) preferably is delayed relative to multiplex signal ($MX_{LS}$) by a fraction of a cycle of source clock signal 38 ($SCK_{DP}$). The length of the delay preferably is selected based upon noise considerations and the sampling method implemented in data recovery slicer circuit 50.

Data recovery slicer circuit 50 may be implemented as a conventional slicer circuit that samples a received signal and outputs a high logic level when the sampled signal value is greater than a target value, and outputs a low logic level when the sampled signal value is less than the target value. Data recovery slicer circuit 50 is configured to generate an intermediate recovered data signal 58 by slicing the time-delayed multiplex signal ($MX_{DELAYED}$). The time-delayed multiplex signal ($MX_{DELAYED}$) may be sliced at a level that is greater than the sum of the low source data signal logic level and the high source clock signal logic level or, alternatively, at a level that is less than the sum of the high source data signal logic level and the low source clock signal logic level. In the illustrated embodiment, data recovery slicer circuit 50 is configured to sample the time-delayed multiplex signal ($MX_{DELAYED}$) on the falling edge of the recovered clock signal ($RCK_{LS}$) (indicated by arrows in FIG. 6B). Accordingly, data recovery slicer circuit 50 may slice the time-delayed multiplex signal ($MX_{DELAYED}$) at a level that is greater than +0.5 (preferably at a level of +1). In an alternative embodiment, data recovery slicer circuit 50 may be triggered on the rising edge of the recovered clock signal ($RCK_{LS}$). In these embodiments, data recovery slicer circuit 50 may slice the time-delayed multiplex signal ($MX_{DELAYED}$) at a level that is less than −0.5 (preferably at a level of −1).

The intermediate recovered data signal 58 is fed to receive data detection circuit 52, which is configured to generate a recovered data signal 60 ($RD_{LS}$). Receive data detection circuit 52 may be implemented as a convention data recovery circuit.

Other embodiments are within the scope of the claims. For example, bi-directional isolation system 10 may be used to provide a similar isolation function in other, non-telephony applications, including communication, medical and instrumentation applications.

I claim:

1. A bi-directional isolation system for providing an isolated communication channel for a source data signal synchronized by a source clock signal, comprising:

a bi-directional isolation barrier;

a source interface circuit coupled on one side of the isolation barrier and configured to multiplex the source clock signal on the source data signal and to transmit the multiplex signal across the isolation barrier; and an isolated interface circuit coupled on an opposite side of the isolation barrier and configured to generate from the multiplex signal a recovered data signal and a recovered clock signal synchronized with the source clock signals, wherein the source interface circuit is configured to quantize the source data signal and the source clock signal to respective logic levels and the source clock signal logic levels span a wider range of values than the source data signal logic levels.

2. The system of claim 1, wherein the source interface circuit multiplexes the source clock signal on the source data signal by summing the source clock signal and the source data signal.

3. The system of claim 1, wherein the source clock signal logic levels span a wider range of values than the source data signal logic levels.

4. The system of claim 3, wherein the isolated interface circuit generates the recovered clock signal by slicing the multiplex signal at an intermediate multiplex signal level.

5. The system of claim 4, wherein the isolated interface circuit generates the recovered clock signal by slicing the multiplex signal at a level between a sum of a low source data signal logic level and a high source clock signal logic level and a sum of a high source data signal logic level and a low source clock signal logic level.

6. The system of claim 3, wherein the isolated interface circuit generates the recovered data signal by slicing a time-delayed version of the multiplex signal.

7. The system of claim 6, wherein the time-delayed version of the multiplex signal is sliced synchronously with the recovered clock signal.

8. The system of claim 6, wherein the time-delayed version of the multiplex signal is sliced at a level greater than a sum of a low source data signal logic level and a high source clock signal logic level.

9. The system of claim 6, wherein the time-delayed version of the multiplex signal is sliced at a level less than a sum of a high source data signal logic level and a low source clock signal logic level.

10. A bi-directional isolation method for providing an isolated communication channel across a bi-directional isolation barrier for a source data signal synchronized by a source clock signal, comprising:

on one side of the isolation barrier, multiplexing the source clock signal on the source data signal and transmitting the multiplex signal across the isolation barrier; and on an opposite side of the isolation barrier, generating from the multiplex signal a recovered data signal and a recovered clock signal synchronized with the source clock signal, quantizing the source data signal and the source clock signal to respective logic levels, wherein the source clock signal logic levels span a wider range of values than the source data signal logic levels.

11. The method of claim 10, wherein the source clock signal is multiplexed on the source data signal by summing the source clock signal and the source data signal.

12. The method of claim 10, further comprising generating the recovered clock signal by slicing the multiplex signal.

13. The method of claim 12, wherein the recovered clock signal is generated by slicing the multiplex signal at an intermediate multiplex signal level.

14. The method of claim 13, wherein the recovered clock signal is generated by slicing the multiplex signal at a level between a sum of a low source data signal logic level and a high source clock signal logic level and a sum of a high source data signal logic level and a low source clock signal logic level.

15. The method of claim 12, wherein the recovered data signal is generated by slicing a time-delayed version of the multiplex signal.

16. The method of claim 15, wherein the time-delayed version of the multiplex signal is sliced synchronously with the recovered clock signal.

17. The method of claim 15, wherein the time-delayed version of the multiplex signal is sliced at a level greater than a sum of a low source data signal logic level and a high source clock signal logic level.

18. The method of claim 15, wherein the time-delayed version of the multiplex signal is sliced at a level less than a sum of a high source data signal logic level and a low source clock signal logic level.

* * * * *